(12) United States Patent
Brown (10) Patent No.: US 11,262,834 B1
(45) Date of Patent: Mar. 1, 2022

(54) DATA PROCESSING SYSTEM AND METHOD FOR MONITORING SYSTEM PROPERTIES

(71) Applicant: Arm Limited, Cambridge (GB)

(72) Inventor: Dominic William Brown, Ely (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/149,297

(22) Filed: Jan. 14, 2021

(51) Int. Cl.
 *G06F 1/00* (2006.01)
 *G06F 1/3296* (2019.01)
 *G06F 1/28* (2006.01)

(52) U.S. Cl.
 CPC .............. *G06F 1/3296* (2013.01); *G06F 1/28* (2013.01)

(58) Field of Classification Search
 CPC ................................. G06F 1/28; G06F 1/3296
 See application file for complete search history.

(56) References Cited

U.S. PATENT DOCUMENTS

| | | | | |
|---|---|---|---|---|
| 5,765,004 A | * | 6/1998 | Foster ..................... | G06F 9/463 713/323 |
| 6,085,325 A | * | 7/2000 | Jackson ................... | G06F 1/325 713/300 |
| 10,621,128 B2 | * | 4/2020 | Brown ..................... | G06F 1/325 |
| 10,725,955 B2 | * | 7/2020 | Brown ................ | G06F 13/4213 |

* cited by examiner

*Primary Examiner* — Nitin C Patel
(74) *Attorney, Agent, or Firm* — Nixon & Vanderhye P.C.

(57) ABSTRACT

A data processing system and method are provided for outputting from each of a plurality of monitoring units, for storage in storage circuitry, monitoring data indicative of a property of the data processing system, wherein at least one monitoring unit is provided within a power domain operable in a low power mode where the at least one monitoring unit is unable to output monitoring data. A system control processor is employed to read the monitoring data from the storage circuitry, and to perform system control operations in dependence on the monitoring data. In response to a notification that the power domain is to be placed into the low power mode, status data is output indicating that the at least one monitoring unit is disabled, and the status data is stored in the storage circuitry. Subsequently, the status data is provided to the system control processor in response to an attempt to read the monitoring data.

22 Claims, 8 Drawing Sheets

DATA PROCESSING SYSTEM AND METHOD FOR MONITORING SYSTEM PROPERTIES

TECHNICAL FIELD

The present invention relates to data processing. More particularly the present invention relates to techniques for monitoring system properties within data processing systems.

BACKGROUND

Data processing systems are provided with system control processors to perform system control operations dependent on properties of the data processing system. To this end, data processing systems are often provided with monitoring units to output monitoring data based on the properties of the data processing system. The system control processor is able to use this data to make informed decisions regarding the system control operations. In data processing systems where monitoring units are provided within power domains capable of operating in a low power mode, when the power domain is operating in the low power mode the monitoring unit is unable to output monitoring data, and this may cause the system control processor to make decisions regarding the system control operations in ignorance of at least some properties of the data processing system or the state of the monitoring unit.

SUMMARY

In example implementations described herein there is a data processing system comprising: a plurality of monitoring units, each monitoring unit being arranged to output, for storage in storage circuitry, monitoring data indicative of a property of the data processing system being monitored by that monitoring unit; and a system control processor to read the monitoring data from the storage circuitry and to perform one or more system control operations in dependence on the read monitoring data, wherein: at least one monitoring unit within the plurality of monitoring units is provided within a power domain that is operable in a plurality of power modes including a low power mode where the at least one monitoring unit is unable to output monitoring data; and the at least one monitoring unit is responsive to a notification that the power domain is to be placed into the low power mode, to output status data for storing in the storage circuitry to indicate that the at least one monitoring unit is currently disabled from generating monitoring data, the status data being stored within the storage circuitry such that when the system control processor subsequently attempts to read the monitoring data for the at least one monitoring unit, the system control processor is provided with the status data.

In example implementations described herein there is a data processing method comprising: outputting from each monitoring unit of a plurality of monitoring units, for storage in storage circuitry, monitoring data indicative of a property of a data processing system being monitored by that monitoring unit, wherein at least one monitoring unit within the plurality of monitoring units is provided within a power domain that is operable in a plurality of power modes including a low power mode where the at least one monitoring unit is unable to output monitoring data; employing a system control processor to read the monitoring data from the storage circuitry, and to perform one or more system control operations in dependence on the read monitoring data; outputting, in response to a notification that the power domain is to be placed into the low power mode, status data for storing in the storage circuitry to indicate that the at least one monitoring unit is currently disabled from generating monitoring data; storing the status data in the storage circuitry; and providing, subsequently, the status data to the system control processor in response to an attempt to read the monitoring data.

In example implementations described herein there is a data processing system comprising: means for outputting from each monitoring unit of a plurality of monitoring units, for storage in storage circuitry, monitoring data indicative of a property of the data processing system being monitored by that monitoring unit, wherein at least one monitoring unit within the plurality of monitoring units is provided within a power domain that is operable in a plurality of power modes including a low power mode where the at least one monitoring unit is unable to output monitoring data; means employing a system control processor to read the monitoring data from the storage circuitry and to perform one or more system control operations in dependence on the read monitoring data; means for outputting, in response to a notification that the power domain is to be placed into the low power mode, status data for storing in the storage circuitry to indicate that the at least one monitoring unit is currently disabled from generating monitoring data; means for storing the status data in the storage circuitry; and means for providing, subsequently, the status data to the system control processor in response to an attempt to read the monitoring data.

BRIEF DESCRIPTION OF THE DRAWINGS

The present invention will be described further, by way of example only, with reference to example implementations thereof as illustrated in the accompanying drawings, in which.

DESCRIPTION OF EXAMPLE IMPLEMENTATIONS

In accordance with some example configurations there is provided a data processing system that has a plurality of monitoring units, where each monitoring unit is arranged to output, for storage in storage circuitry, monitoring data indicative of a property of the data processing system being monitored by that monitoring unit. The data processing system also incorporates a system control processor to read the monitoring data from the storage circuitry and to perform one or more system control operations in dependence on the read monitoring data. At least one monitoring unit within the plurality of monitoring units is provided within a power domain that is operable in a plurality of power modes including a low power mode where the at least one monitoring unit is unable to output monitoring data. The at least one monitoring unit is responsive to a notification that the power domain is to be placed into the low power mode, to output status data for storing in the storage circuitry to indicate that the at least one monitoring unit is currently disabled from generating monitoring data. Furthermore, the status data is stored within the storage circuitry such that when the system control processor subsequently attempts to read the monitoring data for the at least one monitoring unit, the system control processor is provided with the status data.

By providing storage circuitry that can be accessed by both the monitoring units that output monitoring data to the storage circuitry, and the system control processor that reads the monitoring data from the storage circuitry, the system control processor is able to read the monitoring data independent of whether the power domain, in which the monitoring unit is provided, is in the low power mode. The storage circuitry may be variously provided and could be part of general system memory, a dedicated cache, or a set of dedicated registers. However, the inventors have realised that when the power domain is in the low power mode, the monitoring data read by the system control processor will not be updated, and as a result the system control operations may be carried out in dependence on monitoring data that was written prior to the power domain entering the low power mode. Absent any other information, the system control processor must assume that the monitoring data is up to date and would perform system control operations under this assumption, potentially resulting in reduced performance or efficiency. However, in accordance with the techniques described herein, the data processing system is configured to provide a notification to the monitoring unit, prior to the power domain being placed into the low power mode, to inform the monitoring unit that it will be unable to output data. In response, the monitoring unit outputs status data, to be stored in the storage circuitry, to indicate that the monitoring unit is currently unable to output monitoring data. This status data is stored in a manner that ensures that is made available to the system control processor when it seeks to read the monitoring data. Hence, the system control processor is able to determine that the monitoring unit has been placed intentionally in the low power mode and is able to perform the system control operations taking this information into account.

The timing with which the system control processor reads the data and with which the monitoring unit writes the data may be varied dependent on implementation. However, in accordance with some example configurations the system control processor is adapted to read the monitoring data from the storage circuitry asynchronously to the writing of the monitoring data by the plurality of monitoring units. Eliminating the requirement for synchronisation between the system control processor and the monitoring provides greater flexibility as the monitoring units are able to output data on a first schedule determined, for example, based on the type of property being monitored, whilst the system control processor is able to read the data on a second schedule determined, for example, by system power or performance requirements.

Furthermore, in accordance with some example configurations the plurality of monitoring units are arranged to operate independently of the system control processor to periodically output the monitoring data. This eliminates the need for the system control processor to communicate with the monitoring units allowing each monitoring unit further independence and control over when monitoring data is to be output, whilst the system control processor is able to read the last written set of monitoring data from the storage circuitry, thus obtaining the last written set of monitoring data and any status data that has been stored in association with the monitoring data.

In accordance with some example configurations the data processing system further comprises domain control circuitry within the power domain, and a power controller to perform a handshake communication with the domain control circuitry prior to placing the power domain into the low power mode. The power controller controls the provision of power to the power domain and is responsible for switching the power domain between an active mode (in which the monitoring unit provided in the power domain is able to output monitoring data) and the low power mode (in which the monitoring unit is no longer able to output monitoring data). In some example configurations the power controller is provided as a hardware unit independent to the system control processor. In alternative example configurations the system control processor and the power controller could be provided as processes being executed on the same physical hardware.

It should be noted that whilst in some implementations a power domain may be switchable between just two modes, in other implementations there could be more than two modes of operation associated with a power domain. In such an implementation there could for example be more than one mode where the monitoring units is able to continue outputting monitoring data and/or more than one low power mode where it is not able to continue outputting monitoring data.

The handshake communication can comprise various signals between the power controller and the domain control circuitry. However, in accordance with some example configurations the handshake communication comprises at least a request signal issued from the power controller to the domain control circuitry to indicate that the power domain is to be placed in the low power mode, and a response signal issued by the domain control circuitry to the power controller to indicate that components within the power domain are ready to be placed in the low power mode. Removing the power to the power domain with no warning could result in components of the power domain being left in an unstable state and could result in data corruption or loss. As part of the handshake communication, the power controller first issues a request to the domain control circuitry. The power controller then waits for the response signal to be provided before the power controller removes the power to the power domain. This ensures that the circuitry provided within the power domain is stable and will not result in data loss.

In accordance with some example configurations the domain control circuitry is adapted to wait for an indication from the at least one monitoring unit that the status data has been output for storage in the storage circuitry prior to issuing the response signal. In response to the signal issued by the power controller, the domain control circuitry may issue the notification that the power domain is to be placed into the low power mode to the monitoring unit. As discussed, the notification triggers the monitoring unit to output the status data to the storage circuitry. Once this is complete, the monitoring unit may provide an indication to the domain control circuitry that the status data has been output and, when the domain control circuitry has received indications that all the components within the power domain are ready to enter the low power mode, the domain control circuitry can be arranged to then issue the response to the domain control circuitry. In this way, the domain control circuitry communicates with the monitoring unit and the power controller to ensure that the status data is output before the power domain is placed in the low power mode.

In accordance with some example configurations, when the power domain subsequently exits the low power mode, the at least one monitoring unit is arranged to cause the status data to be cleared from the storage circuitry. The power controller is responsible for switching the power domain from the low power mode to an active mode. The monitoring unit is responsive to this switch to cause the status data to be cleared from the storage circuitry. The status data can be cleared in various ways. In some example configurations, the monitoring unit may be configured to overwrite the status data with monitoring data, and in some configurations the monitoring unit may overwrite the status data with further status data indicating that the monitoring unit is active but has not yet output monitoring data.

The status data may be stored in a variety of different ways. In accordance with some example configurations storing the status data in the storage circuitry for a given monitoring unit comprises overwriting previous monitoring data stored for the given monitoring unit. Storing the status data in this way reduces the overall size of the data that needs to be retained for each monitoring unit. In accordance with some alternative example configurations storing the status data in the storage circuitry for a given monitoring unit comprises writing the status data as metadata stored in association with monitoring data stored for the given monitoring unit. Storing the status data as metadata associated with the monitoring data means that the most recently recorded set of monitoring data remains available to the system control processor whilst the monitoring unit is unable to output data. Where the status data is written as metadata stored in association with the monitoring data the status data can be written in parallel with current monitoring data or can be written as metadata stored in association with previous monitoring data stored for the given monitoring unit.

The location in which each monitoring unit causes the data to be stored to the storage circuitry may be variously provided. In accordance with some example configurations each monitoring unit is arranged to cause the monitoring data to be written to a location in the storage circuitry that is uniquely associated with that monitoring unit, the monitoring data overwriting previous monitoring data written to the location by that monitoring unit. In this way the monitoring data can be stored in a compact form that is identifiable to the system control processor.

In accordance with an alternative example configuration each monitoring unit is arranged to cause the monitoring data to be stored in association with a sample identifier when written in the storage circuitry to indicate which monitoring unit has output that monitoring data. This approach provides flexibility for different areas and different sized portions of the storage circuitry to be used for each monitoring unit.

In accordance with some example configurations the storage circuitry is accessible to the system control processor when the power domain is in the low power mode. Hence, the system control processor is able to access the status data and perform system control processes based on the knowledge that the monitoring unit is currently unable to output the monitoring data.

In accordance with some example configurations the status data indicates that the power domain is in the low power mode. The status data could be provided as a single Boolean value indicative as to whether the power domain is in the low power mode or not. Alternatively, the status data could comprise more detailed information, for example information indicative of which of a plurality of low power modes the power domain has been placed into, a time at which the power domain was placed into the low power state, and/or information indicative as to why the power domain has been placed into the low power state.

The monitoring unit can be configured to output monitoring data relating to a variety of different properties. In accordance with some example configurations the monitoring data may represent a system level parameter measured by a sensor coupled to the at least one monitoring unit. Alternatively, or in addition, the monitoring data may represent a performance metric of one or more components of the data processing system being monitored by the at least one monitoring unit. For example, the system level parameter could be a temperature, a power use indicator, or a clock frequency. The performance metric could for example be a utilisation of a storage device, a queue, processing circuitry, an interconnect or a data channel, or as an another example could be an indication of a frequency of memory accesses or cache misses.

In accordance with some example configurations, the at least one monitoring unit may be arranged to output control data to indicate the state of a write operation being performed to store a current item of monitoring data. For example, the at least one monitoring unit may be adapted to, prior to outputting the monitoring data, write control data to the storage circuitry to indicate that the monitoring data is being written. In addition, subsequent to outputting the monitoring data, the at least one monitoring unit may be adapted to modify the control data to indicate that the monitoring data is not currently being written. The control data can be variously provided. For example, the control data could be provided as metadata associated with the monitoring data or could be encoded into the monitoring data itself. The control data could be provided as a single bit of data that takes a first value when the monitoring data is being written and that takes a second value when the data is not currently being written. Alternative ways in which the control data can be provided are discussed below.

In accordance with some example configurations the system control processor is arranged, when the control data indicates that the monitoring data is being written, to postpone reading the monitoring data. The system control processor may be arranged to read the control data prior to reading the monitoring data and may postpone issuing a request to read the monitoring data when the control data indicates that the monitoring data is currently being written.

Alternatively, the system control processor could be arranged to issue a single request to read the monitoring data and the control data, and when the control data indicates that the monitoring data is currently being written, discard the data. The provision of the control data in this manner prevents the system control processor from performing system control operations based on data that is in the process of being written and, as a result, may be incomplete or incorrect.

In accordance with some example configurations the control data comprises first control data and second control data. In such an implementation, writing the control data may comprise writing, as the first control data, a counter value, and modifying the control data may comprise writing, as the second control data, the counter value. Prior to writing the monitoring data both the first control data and the second control data contain a previous counter value. The monitoring unit is adapted to, as part of the outputting process, to write the counter value (different to the previous counter value) as the first control data. Hence, whilst the monitoring data is being written, the first control data contains the counter value and the second control data contains the previous counter value. Then once the monitoring data has been written, the monitoring unit outputs the counter value (the same counter value as was output as the first control data) as the second control data. In this way the control data defines both whether the monitoring data is being currently written and an identifier of an instance of the data that has been written.

The counter value can be variously provided. However, in accordance with some example implementations the counter value is a timestamp indicative of a time at which the monitoring data is written. Hence, when the control data is read it can be determined how recent the monitoring data is.

In accordance with some example configurations the system control processor is arranged, prior to reading the monitoring data, to read the first control data and the second control data. When the first control data and the second control data comprise a same counter value the system control processor is then arranged to: when the same counter value is equal to a previously read counter value, postpone reading the monitoring data; and when the same counter value is different to the previously read counter value, read the monitoring data and set, as the previously read counter value, the same counter value. The system control processor keeps track of a previously read counter value associated with the monitoring unit. Hence, when the system control processor reads the control data it can determine whether monitoring data is currently being written (first control data is different to the second control data) and whether the monitoring data has been updated since the system control processor last read the monitoring data (at least one of the first control data and the second control data are different to the previously read monitoring data). Where it is determined that the monitoring data is currently being written, or that the monitoring data has not been updated since it was last read, the system control processor can postpone the reading of the monitoring data to allow the monitoring unit time to output the monitoring data. Where it is determined that the monitoring data has been updated since the last time the system control processor read the monitoring data, the system control processor is adapted to read the monitoring data and update the previously read counter value to be equal to the same counter value (equal to the first control data and equal to the second control data).

In accordance with some example configurations the system control processor is adapted to, subsequent to reading the monitoring data, read the first control data and the second control data. Then, when any two of the first control data, the second control data and the previously read counter value are different, the system control processor is arranged to discard the monitoring data. If the monitoring unit begins outputting the monitoring data whilst the system control processor is reading the monitoring data, the monitoring data read by the system control processor could be incomplete or incorrect. In order to prevent this the control data may be read a second time subsequent to the monitoring data being read. If all three of the previously read counter value, the first control data and the second control data are the same then the system control processor can determine that the monitoring data has not been modified by the monitoring unit whilst it is being read. If the first control data and the second control data are different then the system control processor can determine that the monitoring unit began outputting the monitoring data whilst it was being read and that the monitoring unit is still outputting the monitoring data. In this case, the system control processor can postpone reading the monitoring data. If the first control data and the second control data are the same, yet are different to the previously read counter value then the system control processor can determine that the monitoring unit output monitoring data whilst the monitoring data was being read but has now finished outputting monitoring data. In this case, the system control processor can either postpone reading the monitoring data or, as the monitoring data is not currently being output (the first control data is equal to the second control data) the system control processor can immediately issue a further read request to read the monitoring data, and subsequent to reading the monitoring data, issue a further control data read request to ensure that the monitoring data has not been modified during reading.

Particular example implementations will now be described with reference to the figures.

Figure 1:
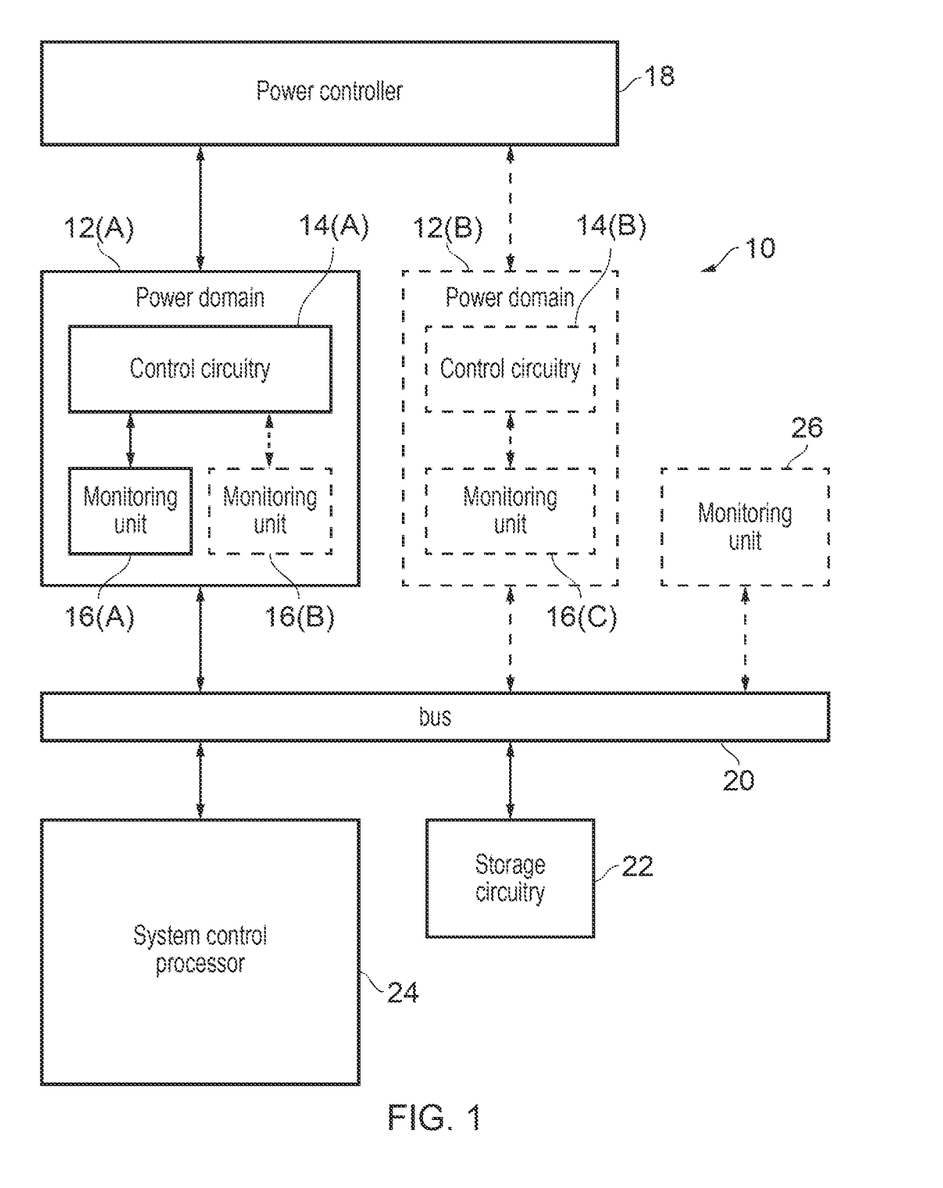
FIG. 1 schematically illustrates an overview of a data processing system according to some example configurations of the invention.

FIG. 1 illustrates a data processing system 10 in accordance with some example configurations. The data processing system 10 comprises one or more power domains 12, power controller 18, bus 20, storage circuitry 22 and system control processor 24. The data processing system further comprises monitoring units 16 within the one or more power domains 12 and monitoring units 26 external to the power domains 12. Within each power domain 12 there is provided control circuitry 14 and one or more monitoring units 16. The monitoring units 16, 26 are arranged to communicate via the bus 20 with the storage circuitry 22 and to output monitoring data indicative of a property of the data processing system 10 to the storage circuitry 22. The system control processor 24 is arranged to communicate via the bus 20 with the storage circuitry 22 and to perform system control operations in dependence on monitoring data read from the storage circuitry 22. The storage circuitry 22 is provided outside of the one or more power domains 12 and is accessible to the system control processor 24 independent of the power mode of each of the power domains 12. Power modes of each of the power domains 12 are independently controlled by the power controller 18 which may be instructed by the system control processor 24 via the bus 20 (not illustrated).

The power controller 18 is arranged to communicate with the control circuitry 14 within the power domains 12. In particular, the power controller 18 is arranged to initiate a handshake communication with the control circuitry 14 prior to putting the power domain in the low power mode. For example power controller 18 may perform a handshake communication with control circuitry 14(A) in power domain 12(A) by issuing a request to the control circuitry 14(A) to indicate that the power domain 12(A) is to be placed in the low power mode. In response, the control circuitry 14(A) issues a notification that the power domain is to be placed into the low power mode to the one or more monitoring units 16(A), 16(B). This triggers the one or more monitoring units 16(A), 16 (B) to output status data via the bus 20 to the storage circuitry 22 to be stored in the storage circuitry 22 in association with the respective monitoring data generated by the monitoring unit. Once the monitoring units 16(A), 16 (B) have output the status data the one or more monitoring units 16(A), 16 (B) provide an indication to the control circuitry 14(A), which in turn, issues a response to the power controller 18 once responses have been collected from all necessary components within the power domain 12(A). Once the response has been issued the power controller 18 is able to put the power domain 12(A) into the low power mode. Subsequently, when the system control processor attempts to read from the storage circuitry 22 the monitoring data for the either monitoring unit 16(A) or monitoring unit 16(B), the system control processor is provided with the status data.

Figure 2A:
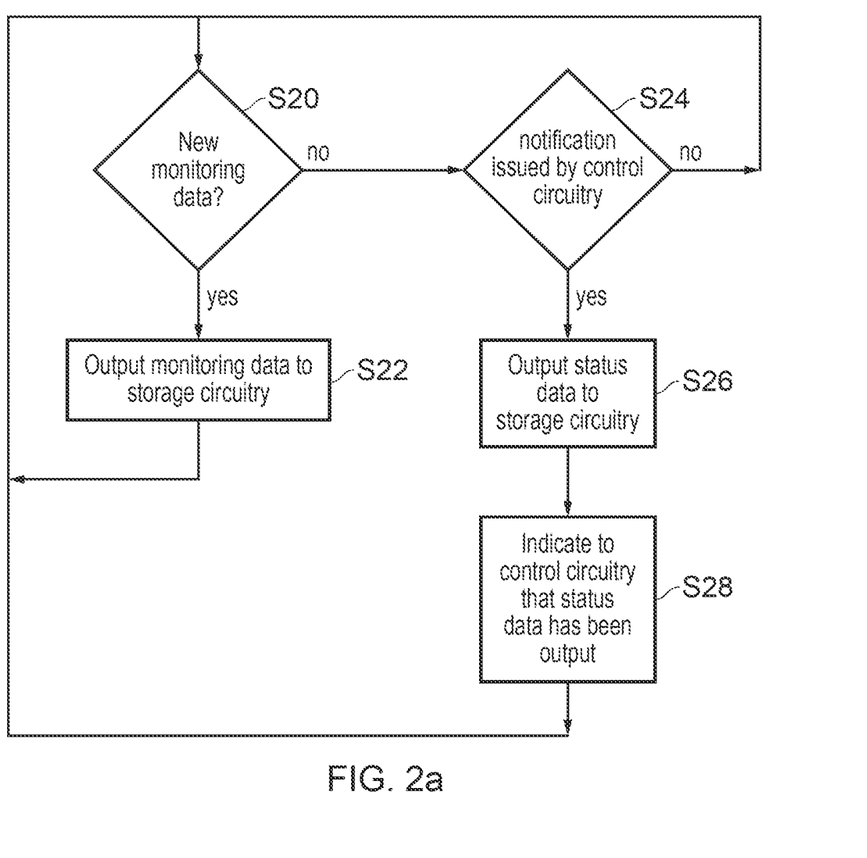
FIG. 2a schematically illustrates a sequence of steps carried out by a monitoring unit in some example configurations of the invention.

FIG. 2a schematically illustrates a sequence of steps carried out by the monitoring unit 16 in some example configurations. Flow starts at step S20 where it is determined if new monitoring data is to be output. If yes, then flow proceeds to step S22 where the monitoring data is output to the storage circuitry before flow returns to step S20. If at step S20 it was determined that there is no new monitoring data to output then flow proceeds to step S24 where it is determined if a notification that the power domain is to be placed into the low power mode has been issued by the control circuitry 18. If no then flow returns to step S20. If, at step S24, it was determined that a notification that the power domain is to be placed into the low power mode has been issued by the control circuitry 18, then flow proceeds to step S26 where the monitoring unit 16 outputs status data to be stored in the storage circuitry. Flow then proceeds to step S28 where an indication is provided to the control circuitry that the status data has been output. Flow then returns to step S20.

Figure 2B:
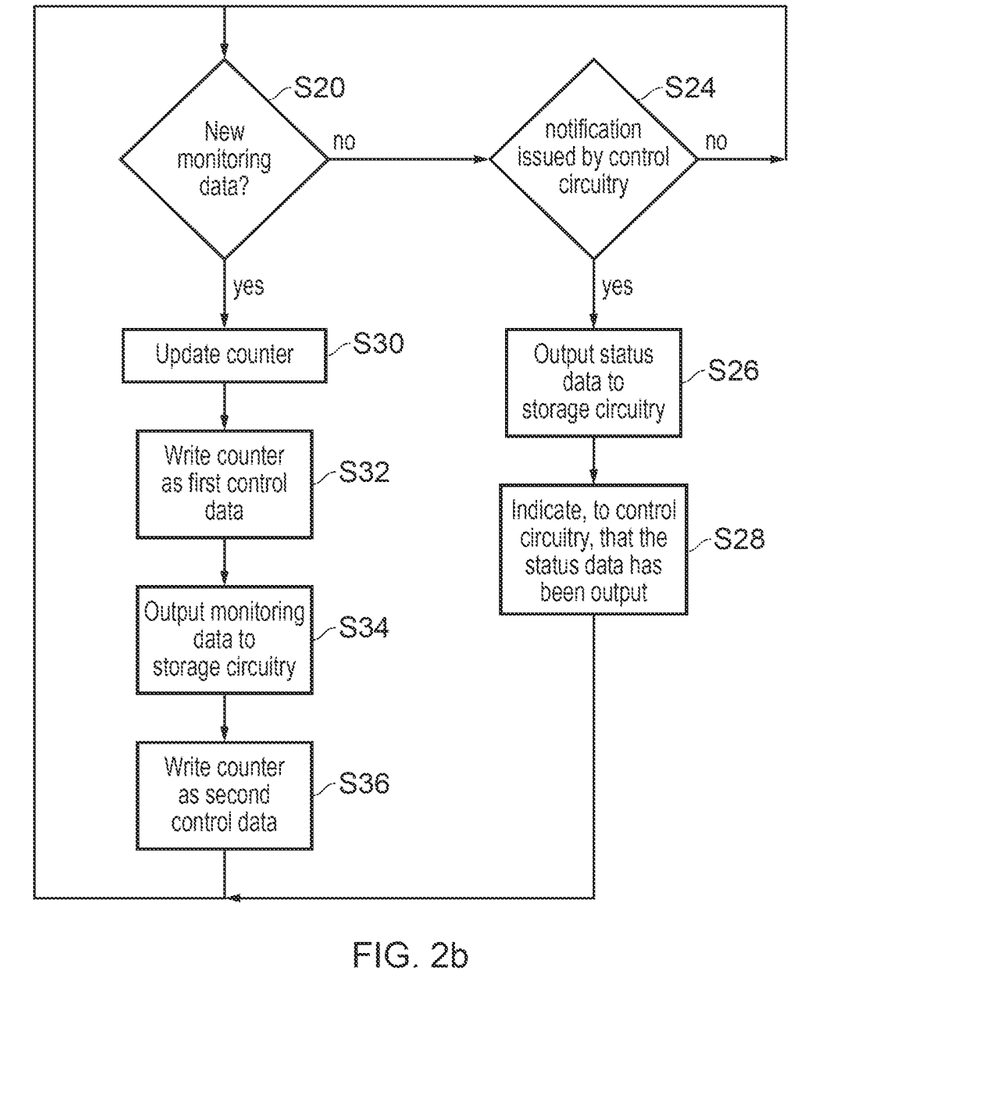
FIG. 2b schematically illustrates a sequence of steps carried out by a monitoring unit in some example configurations of the invention.

FIG. 2b schematically illustrates a sequence of steps carried out by the monitoring unit 16 in some example configurations. Flow begins at step S20 which is identical to step S20 described in relation to FIG. 2a. If it is determined that no new monitoring data is to be output at step S20 then flow proceeds to steps S24-S28 which are identical to those described in relation to FIG. 2a and their description shall not be repeated here. If however, at step S20, it is determined that there is new monitoring data then flow proceeds to step S30 where a counter is updated. Flow then proceeds to step S32 where the counter is written to the storage circuitry 22 as first control data. Flow then proceeds to step S34 where the monitoring data is output to the storage circuitry. Flow then proceeds to step S36 where the counter is written to the storage circuitry as second control data before flow returns to step S20.

Figure 3:
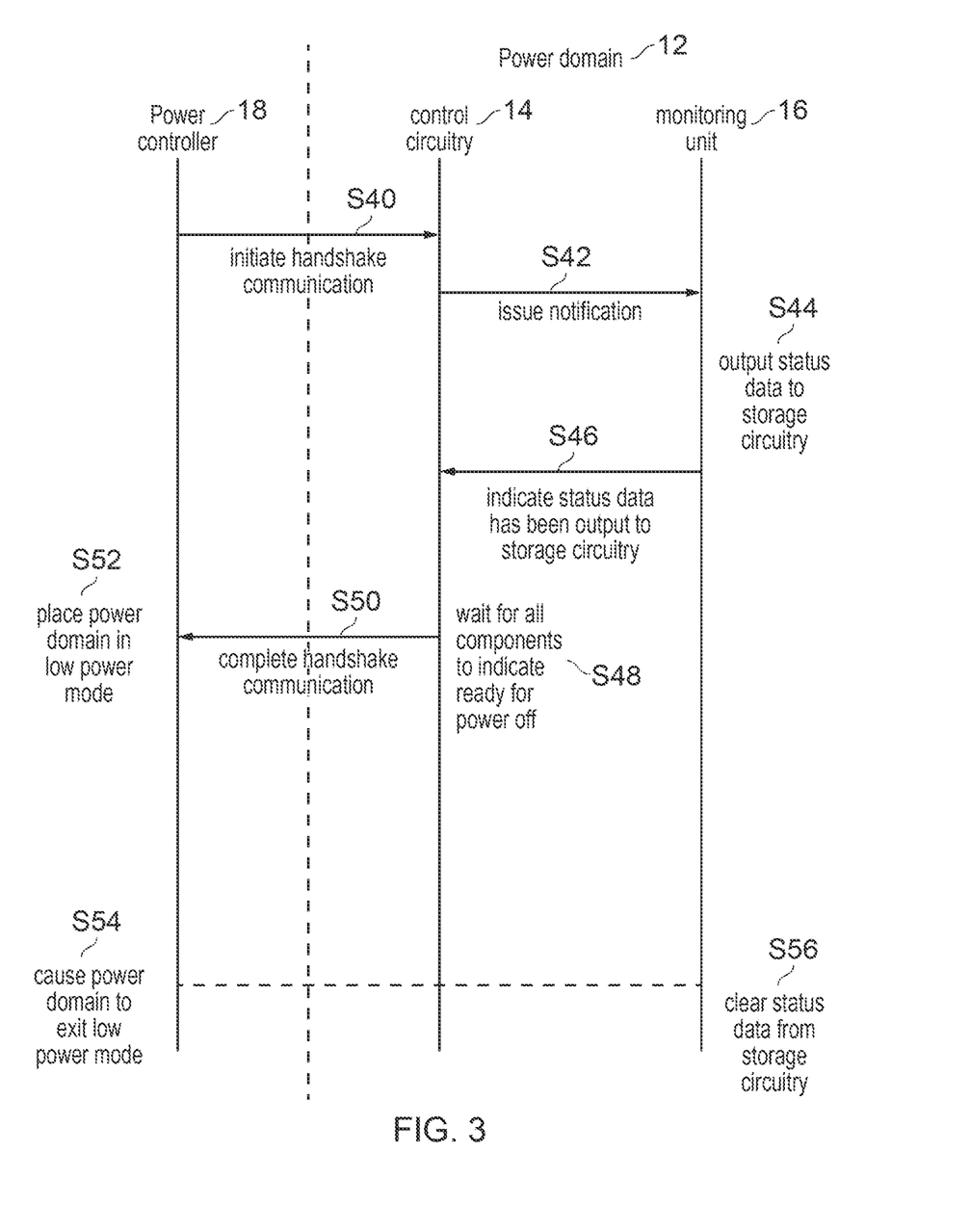
FIG. 3 schematically illustrates a sequence of communications between components of a data processing system according to some example configurations of the invention.

FIG. 3 schematically illustrates a sequence of communications carried out between the power controller 18 and, within the power domain 12, the control circuitry 14 and the monitoring unit 16. At step S40 the power controller 18 initiates a handshake communication with the control circuitry 14 comprising a request signal issued from the power controller 18 to the control circuitry 14 to indicate that the power domain 12 is to be placed into the low power mode. At step S42 the control circuitry 14 issues a notification that the power domain is to be placed into the low power mode to the monitoring unit 16. At step S44, in response to the notification, the monitoring unit outputs status data to the storage circuitry 22. Once the status data has been output to the storage circuitry 22, at step S46 the monitoring unit 16 indicates, to the control circuitry 16, that the status data has been output to the storage circuitry 22. At step S48 the control circuitry 14 waits until all components have indicated that they are ready to be transitioned into the low power mode before, at step S50, issuing a response to the power controller 18 to complete the handshake communication. Once the handshake communication is successfully completed, at step S52 the power controller 18 places the power domain 12 into the low power mode. Whilst the power domain 12 is in low power mode, the system control processor 24 is able to determine, based on the status data in the storage circuitry 22, that the power domain in which the monitoring unit is provided has been placed into the low power mode, and as such the monitoring unit is unable to output monitoring data. Subsequently, at step S54, the power controller 18 causes the power domain 12 to exit the low power mode. At step S56 the monitoring unit 16 is responsive to the power domain 12 exiting the low power mode to clear the status data from the storage circuitry and to resume monitoring of properties of the data processing system.

Figure 4A:
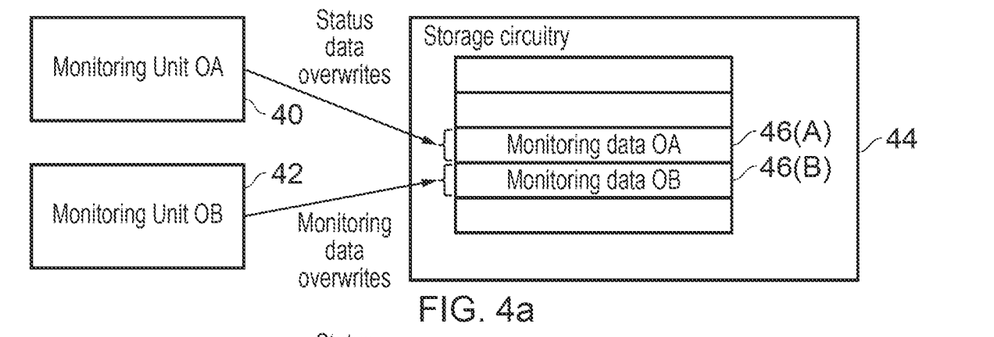
FIG. 4a schematically illustrates the storage of monitoring data and status data in accordance with some example configurations of the invention.

FIGS. 4a-4d schematically illustrate the storage of monitoring data in accordance with some example configurations. Monitoring unit 0A 40 and monitoring unit 0B 42 are arranged to output monitoring data and status data to storage circuitry 44. FIG. 4a schematically illustrates the storage of monitoring data 46 to a location in the storage circuitry that is uniquely associated with that monitoring unit, the monitoring data overwriting previous monitoring data written to the location by that monitoring unit. In particular, monitoring unit 0A 40 writes monitoring data and status data to storage location 46(A), and monitoring unit 0B 42 writes monitoring data and status data to storage location 46(B). When either monitoring unit 40, 42 output status data or monitoring data, to the designated storage location the existing monitoring data or status data is overwritten. For example, if monitoring unit 0A 40 outputs status data this overwrites monitoring data 0A in storage location 46(A). In addition, for example, if monitoring unit 0B 42 outputs monitoring data this overwrite existing monitoring data 0B that is already stored in storage location 46(B).

Figure 4B:
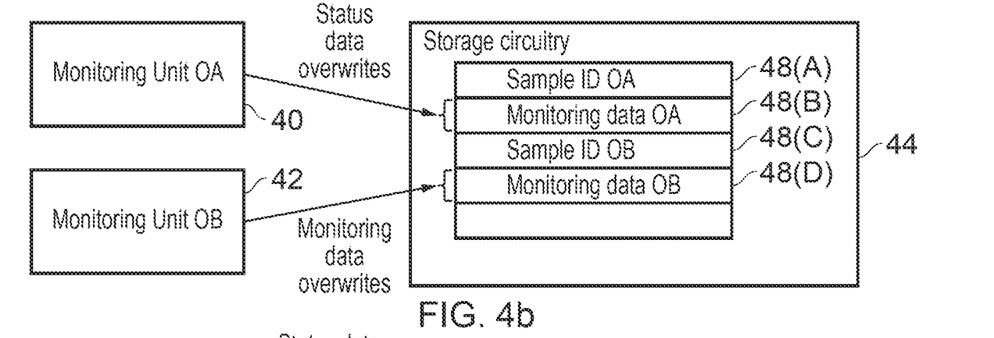
FIG. 4b schematically illustrates the storage of monitoring data and status data in accordance with some example configurations of the invention.

FIG. 4b schematically illustrates the storage of data where, for a given monitoring unit the monitoring data and status data are stored in association with a sample identifier when written in the storage circuitry to indicate which monitoring unit has output that monitoring data. Monitoring unit 0A 40 outputs status data and monitoring data which overwrites existing monitoring data 0A in location 48(B) which is identified as belonging to monitoring unit 0A 40 through sample identifier 0A written to location 48(A). Similarly, monitoring unit 0B 42 outputs status data and monitoring data which overwrites existing monitoring data 0B in location 48(D) which is identified as belonging to monitoring unit 0B 42 through sample identifier 0B stored in storage location 48(C). As previously described, in some example configurations the sample identifiers may further comprise control data indicative as to whether the monitoring data is currently being written.

Figure 4C:
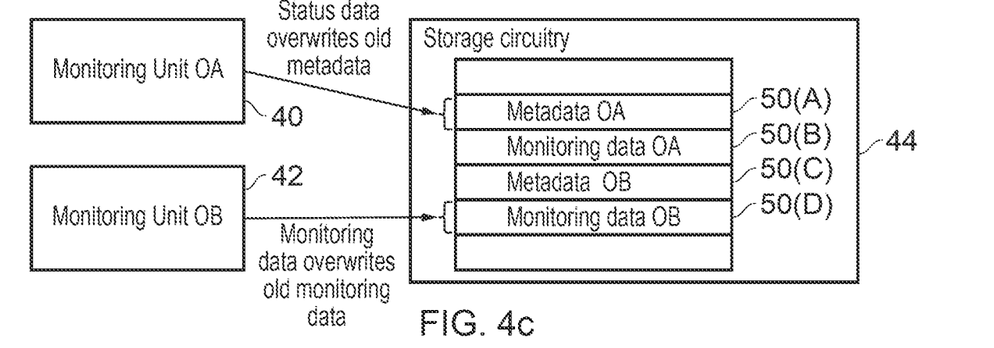
FIG. 4c schematically illustrates the storage of monitoring data and status data in accordance with some example configurations of the invention.

FIG. 4c schematically illustrates the storage of data where, for a given monitoring unit, status data is written as metadata stored in association with monitoring data and where the metadata and the monitoring data are written to a location in the storage circuitry that is uniquely associated with the monitoring unit. Monitoring unit 0A 40 outputs status data that is stored as metadata 0A in storage location 50(A) and overwrites existing metadata that is stored for monitoring unit 0A, and monitoring unit 0A 40 outputs monitoring data that is stored in storage location 50(B) and overwrites existing monitoring data that is stored for monitoring unit 0A. Monitoring unit 0B 42 outputs status data that is stored as metadata 0B in storage location 50(C) and overwrites existing metadata output for monitoring unit 42, and monitoring unit 0B 42 outputs monitoring data that is stored in storage location 50(D) that overwrites existing monitoring data that is stored for monitoring unit 42. In some embodiments monitoring unit 0A 40 updates metadata 0A stored in storage location 50(A) when the monitoring unit 0A 40 outputs monitoring data to storage location 50(B). Similarly, monitoring unit 0B 42 updates metadata 0B stored in storage location 50(C) when the monitoring unit 0B 42 outputs monitoring data to the storage location 50(D).

Figure 4D:
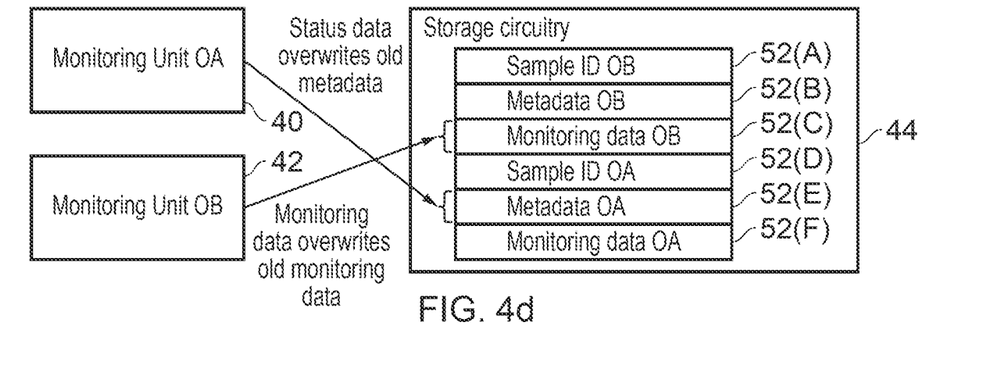
FIG. 4d schematically illustrates the storage of monitoring data and status data in accordance with some example configurations of the invention.

FIG. 4*d* schematically illustrates the storage of data where, for a given monitoring unit, status data is written as metadata stored in association with monitoring data and the monitoring data and the status data are stored in association with a sample identifier when written in the storage circuitry to indicate which monitoring unit has output that monitoring data. Monitoring unit 0A 40 outputs monitoring data and status data to storage circuitry 44 where it is stored in a location identified by sample identifier 0A 52(D). The monitoring data output by monitoring unit 0A 40 is stored in the location 52(F) identified by sample identifier 0A 52(D) and overwrites existing monitoring data that was output by monitoring unit 0A 40. Monitoring unit 0A 40 outputs status data that is written as metadata 0A 52(E) stored to a location identified by sample identifier 52(D) and that overwrites existing metadata 0A 52(E). Monitoring unit 0B 42 outputs monitoring data and status data to storage circuitry 44 where it is stored in a location identified by sample identifier 0B 52(A). The monitoring data output by monitoring unit 0B 42 is stored in the location 52(C) identified by sample identifier 0B 52(A) and overwrites existing monitoring data that was output by monitoring unit 0B 42. Monitoring unit 0B 42 outputs status data that is written as metadata 0B 52(B) stored to a location identified by sample identifier 52(A) and that overwrites existing metadata 0B 52(B). As previously described, in some example configurations the sample identifiers may further comprise control data indicative as to whether the monitoring data is currently being written. In some embodiments monitoring unit 0A 40 updates metadata 0A stored in storage location 52(B) when the monitoring unit 0A 40 outputs monitoring data to storage location 52(C). Similarly, monitoring unit 0B 42 updates metadata 0B stored in storage location 52(E) when the monitoring unit 0B 42 outputs monitoring data to the storage location 52(F). Furthermore, and as previously described, in some example configurations the sample identifiers may further comprise control data indicative as to whether the monitoring data is currently being written.

Figure 5:
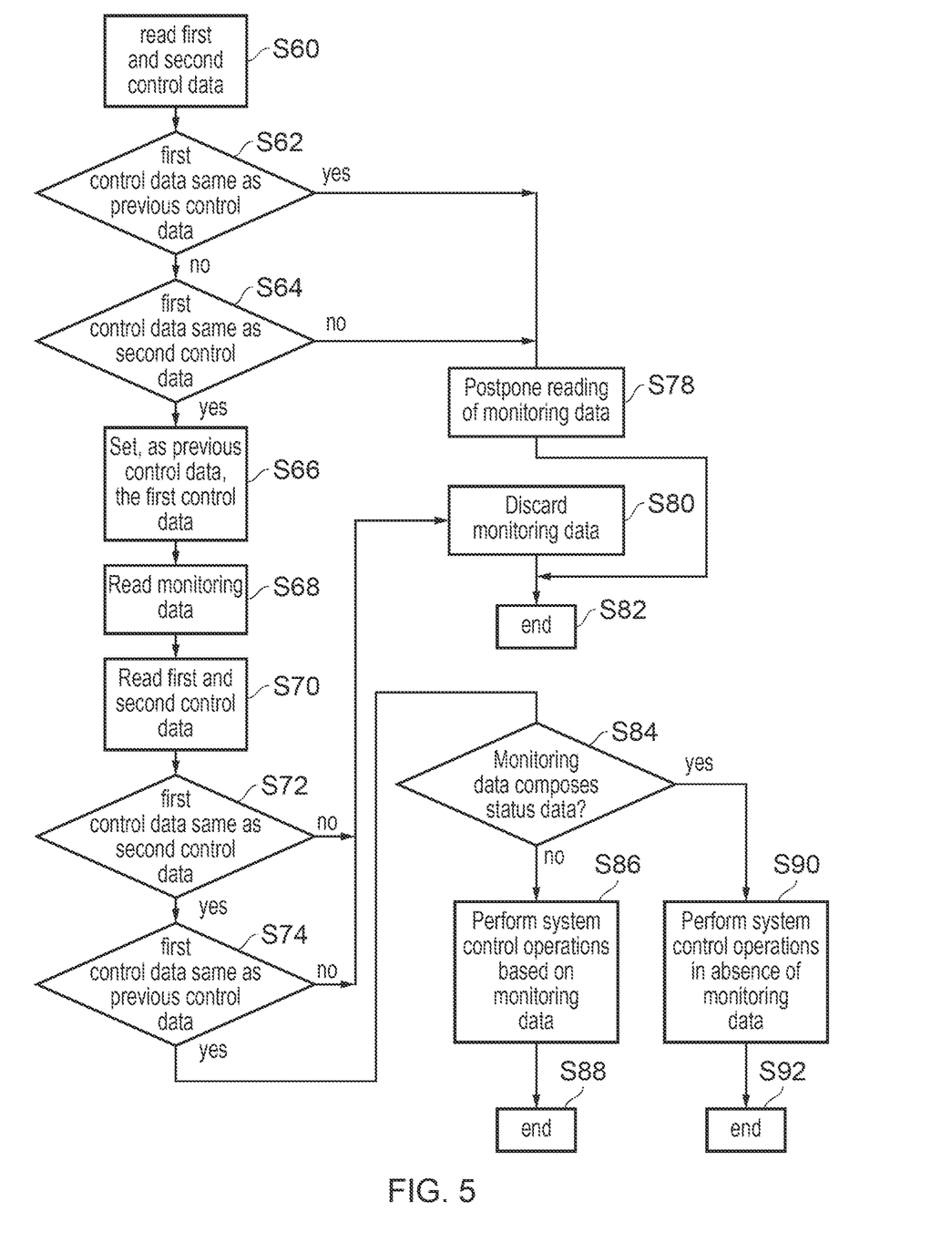
FIG. 5 schematically illustrates a sequence of steps carried out by the system control processor in accordance with some example configurations of the invention.

FIG. 5 schematically illustrates a sequence of steps carried out by the system control processor in accordance with some example configurations where the monitoring data is stored with first and second control data as described in relation to FIG. 2*b*. Flow begins at step S60 where the system control processor reads, for a particular monitoring unit of interest, the associated first control data and second control data from the storage circuitry. Flow then proceeds to step S62 where it is determined if the first control data is the same as the previous control data (i.e. the control data as stored by the system control processor for the particular monitoring unit of interest). If yes then it is determined that the monitoring data has been read previously by the system control processor and flow proceeds to step S78 where the reading of monitoring data is postponed and flow proceeds to step S82 where the process ends.

If at step S62 the result had been no, then it is known that the monitoring data has not been previously read by the system control processing circuitry and flow proceeds to step S64 where it is determined whether the first control data is the same as the second control data. If no then it is determined that the monitoring data is currently being written and flow proceeds to step S78 where the reading of monitoring data is postponed and flow proceeds to step S82 where the process ends.

If at step S64 the result had been yes, then it is known that the monitoring data is not currently being written and flow proceeds to step S66. Whilst step S62 has been illustrated as occurring before step S64, in some implementations step S64 could be carried out prior to step S62, or steps S64 and S62 could be carried out in parallel. At step S66 the system control processor sets, as the previous control data, the first control data. Flow then proceeds to step S68 where the monitoring data is read from the storage circuitry by the system control processor. Whilst step S66 has been illustrated as occurring before step S68, in some implementations step S68 could be carried out prior to step S66, or steps S68 and S66 could be carried out in parallel. Flow then proceeds to step S70 where the first and second control data are read. Flow then proceeds to step S72 where it is determined whether the first control data is the same as the second control data. If no then it is determined that the monitoring unit has begun writing monitoring data whilst the system control processor was reading the monitoring data and flow proceeds to step S80 where the monitoring data is discarded and flow proceeds to step S82 where the process ends.

If at step S72 the result had been yes then it is determined that the monitoring data is not currently being written and flow proceeds to step S74. At step S74 it is determined whether or not the first control data is the same as the previous control data. If no then it is determined that the monitoring data has been modified whilst the system control processor was reading the monitoring data and flow proceeds to step S80 where the monitoring data is discarded and flow proceeds to step S82 where the process ends. If at step S74 the result was yes, then it is determined that the monitoring data has not been modified whilst the system control processor was reading the monitoring data and flow proceeds to step S84. Whilst step S72 has been illustrated as occurring before step S74, in some implementations step S74 could be carried out prior to step S72, or steps S74 and S72 could be carried out in parallel. At step S84 it is determined whether the monitoring data comprises status data indicating that the monitoring unit is unable to currently output monitoring data. If no then flow proceeds to step S86 where a system control operation is performed by the system control processor in dependence on the monitoring data. Flow then proceeds to step S88 where the process ends. If at step S84 the result was yes then flow proceeds to step S90 where system control operations are performed by the system control processor in absence of the monitoring data associated with the monitoring unit (for example using monitoring data read for other monitoring units), and the process then ends at step S92.

Figure 6A:
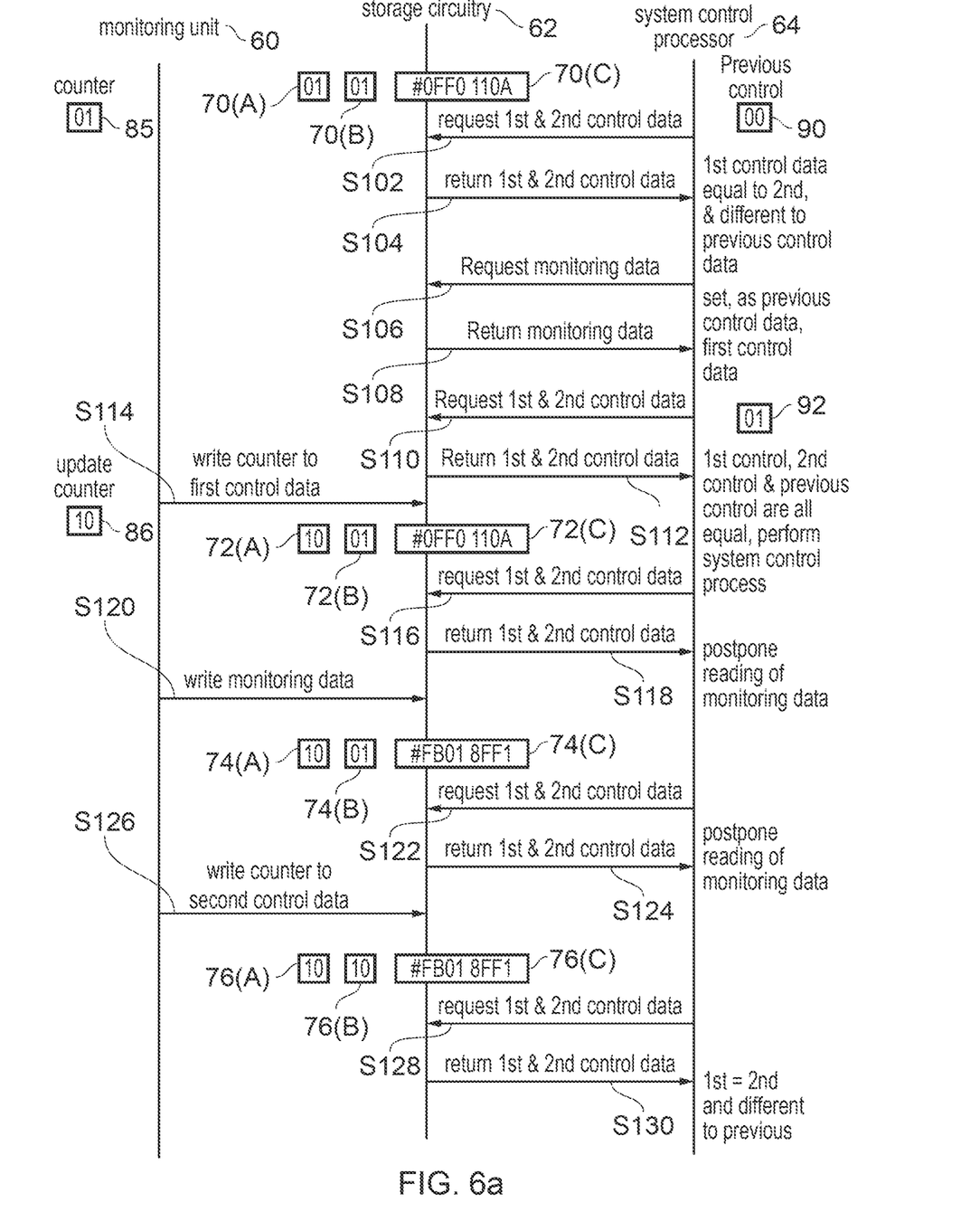
FIG. 6a schematically illustrates a sequence of communications between components of the data processing system according to some example configurations of the invention.
Figure 6B:
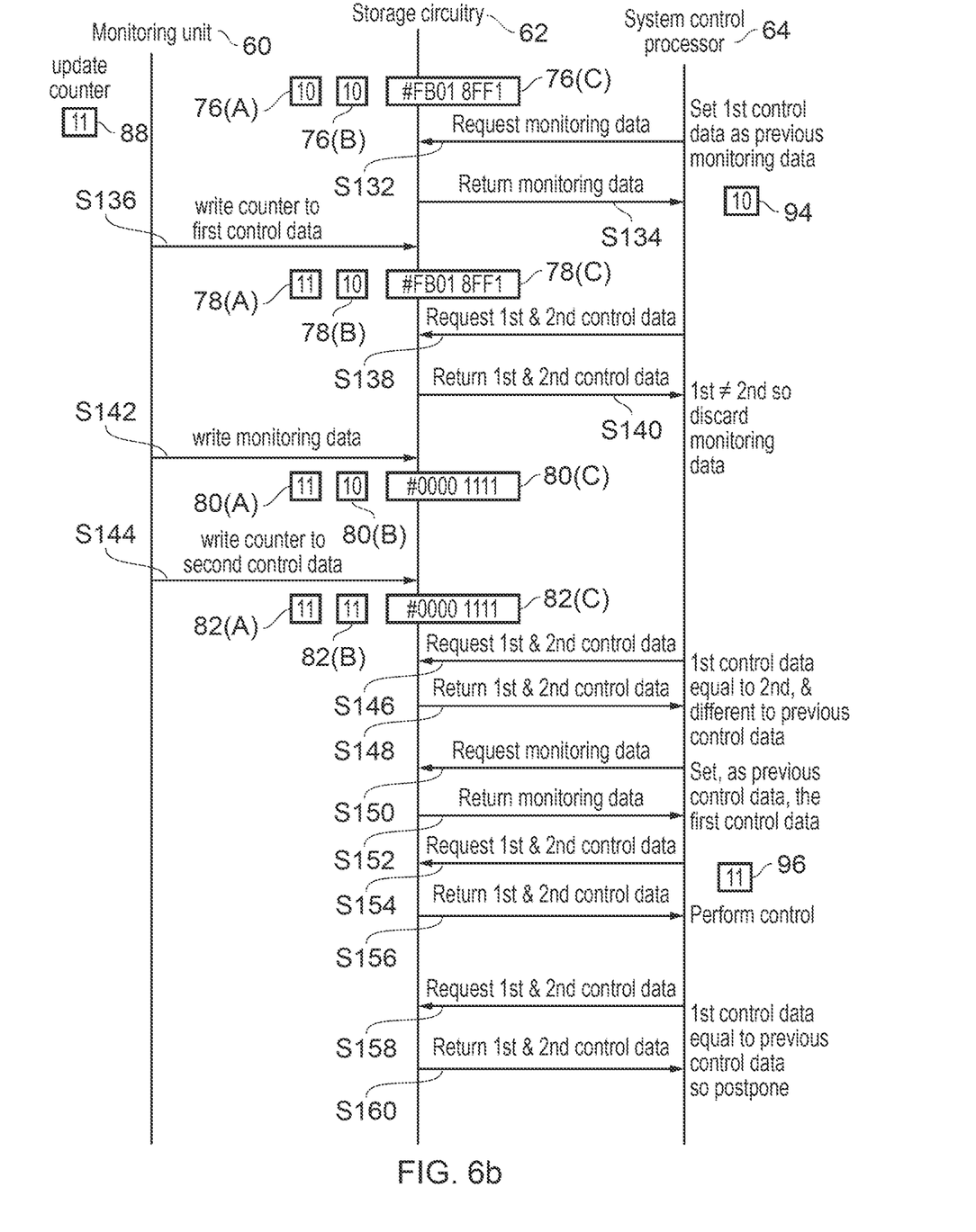
FIG. 6b schematically illustrates a sequence of communications between components of the data processing system according to some example configurations of the invention.

FIGS. 6*a* and 6*b* schematically illustrate a sequence of communications between the system control processor 64, the storage circuitry 62 and a monitoring unit 60 in accordance with some example configurations when the system control processor carries out the sequence of steps as described in relation to FIG. 5. The monitoring unit 60 maintains a counter value 85 to count an instance of monitoring data output by the monitoring unit. In the illustrated implementation the counter value 85 is initially 01. The storage circuitry 62 stores monitoring data 70(C) that is output from the monitoring unit 60 in combination with first control data 70(A) and second control data 70(B). Initially the first control data 70(A) and the second control data 70(B) are both set to the counter value 85 that is output by the monitoring unit 60. The system control processor 64 maintains a previous control value 90. In the illustrated implementation the initial value of the previous control value 90 is set to 00.

Steps S102 to S112 illustrate the reading of monitoring data by the system control processor 64. The process begins at step S102 where the system control processor 64 issues a request to the storage circuitry 62 for the first control data 70(A) and the second control data 70(B). At step S104 the storage circuitry 62 returns the first control data 70(A) and the second control data 70(B) to the system control processor 64 where it is determined that the first control data 70(A) and the second control data 70(B) are equal and that the first control data 70(A) is different to the previous control data 90. Hence, the system control processor 64 is able to determine that the monitoring data 70(C) stored in the storage circuitry 62 has not been previously read by the system control processor 64. At step S106 the system control processor 64 issues a request to the storage circuitry 62 for the monitoring data 70(C) which is returned at step S108. It is noted that, in some example configurations, steps S102 and S106 could be performed in parallel and steps S104 and S108 could also be performed in parallel with the monitoring data 70(C) potentially being subsequently discarded dependent on the comparisons carried out regarding the first control data 70(A), the second control data 70(B) and the previous control value 90. Once the monitoring data is returned at step S108 the system control processor 64 sets, as the previous control data value, the first control data. In the illustrated implementation, the system control processor 64 reads the monitoring data prior to setting, as the previous control data value, the first control data. However, in alternative implementations, the order of these two steps may be swapped, or both steps may occur in parallel. Hence, the previous control data value 92 is set to 01. At step S110 the system control processor requests the first control data 70(A) and the second control data 70(B) which are returned at step S112. Once the first control data 70(A) and the second control data 70(B) are returned it is determined that the first control data 70(A), the second control data 70(B) and the previous control value 92 are all the same. Hence, it is determined that the monitoring data is new data that has been correctly retrieved from the storage circuitry 62 and the system control processor 64 is able to perform a system control process based on the monitoring data.

Steps S114 to S126 illustrate the writing of monitoring data to the storage circuitry 62 by the monitoring unit 60 and how these steps could interact sequentially with attempts, by the system control processor 64, to read the monitoring data whilst it is being written. At step S114 the monitoring unit 114 begins the process of writing monitoring data to the storage circuitry. In particular, the monitoring unit 60 updates the counter value 85 to new counter value 86 and writes the counter to the first control data 72(A). The second counter value 72(B) and the monitoring data remain unaltered. Before the monitoring unit 60 can complete the step of writing monitoring data, the system control processor 64, at step S116, requests the first control data 72(A) and the second control data 72(B). At step S118 the storage circuitry 62 returns the first control data 72(A) and the second control data 72(B) to the system control processor 64 where it is determined that, because the first control data 72(A) and the second control data 72(B) are different, the reading of the monitoring data should be postponed.

At step S120 the monitoring unit 60 completes the writing of monitoring data 74(C). However, prior to the updating of the second control data 74(B), the system control processor again attempts to read the monitoring data and, at step S122 issues a request for the first control data 74(A) and the second control data 74(B). At step S124 the first control data 74(A) and the second control data 74(B) are returned to the system control processor 64, where it is determined that the first control data 74(A) is different from the second control data 74(B) and the system control processor 64 postpones reading of the monitoring data. At step S126 the monitoring unit 60 completes the process of writing the monitoring data by setting the second control data 76(B) to the counter value 86. At this point the first counter value 76(A), the second counter value 76(B) and the monitoring data 76(C) have all been updated and the process of outputting data by the monitoring unit 60 is complete.

Steps S128 to S144 illustrate a sequence of steps carried out when the monitoring unit 60 writes data whilst the system control processor 64 is reading the monitoring data from the storage circuitry 62. At step S128 the system control processor again attempts to read the monitoring data by issuing a request for the first control data 76(A) and the second control data 76(B). At step S130 the storage circuitry 62 returns the first control data 76(A) and the second control data 76(B) and the system control processor 64 determines that the first control data 76(A) is equal to the second control data 76(B) and that the first control data 76(A) is different to the previous control data value 92. The process continues in FIG. 6b where, at step S132, the system control processor 64 issues a request for the monitoring data 76(C) which is returned from the storage circuitry 62 to the system control processor at step S134 where the first control data is set as the previous control data 94. As discussed, the ordering of setting the previous control data and issuing the request for the monitoring data is unimportant and either step may be carried out prior to the other, or both steps may be carried out in parallel.

Before the system control processor can verify that the monitoring data 76(C) has not been modified during the reading process, the monitoring unit 60 begins a second write process. At step S136 the monitoring unit 60 updates the counter 88 and writes the counter to the first control data 78(A). Before the monitoring unit 60 is able to complete the writing process, the system control processor, at step S138, requests the first control data 78(A) and the second control data 78(B) from the storage circuitry 62. At step S140 the first control data 78(A) and the second control data 78(B) are returned to the system control processor 64 where it is determined that the first control data 78(A) and the second control data 78(B) are not the same and, hence, the system control processor 64 cannot verify that the monitoring data 78(C) has not been modified during the reading process and discards the monitoring data. At step S142 the monitoring unit 60 writes monitoring data 80(C) to the storage circuitry 62 and, at step S144 the monitoring unit 60 sets the second control data 82(B) to the counter value 88.

Steps S146 to S156 illustrate a successful read of the monitoring data by the system control processor 64. At step S146 the system control processor begins the process to read the monitoring data by issuing a request for the first control data 82(A) and the second control data 82(B). At step S148 this data is returned to the system control processor where it is determined that the first control data 82(A) and the second control data 82(B) are equal to each other and that the first control data 82(A) is different to the previous monitoring data value 94. Hence, it is determined that the monitoring data 82(C) is not currently being written and that the system control processor 64 has not previously read the monitoring data 82(C). At step S150 the system control processor 64 requests the monitoring data 82(C) from the storage circuitry 62. At step S152 the monitoring data 82(C) is returned to the system control processor 64 where the system control processor 64 sets, as the previous control data 96, the first control data 82(A). As discussed previously, the ordering of setting the previous control data and issuing the request for the monitoring data is unimportant and either step may be carried out prior to the other, or both steps may be carried out in parallel. At step S154 the system control processor again requests the first control data 82(A) and the second control data 82(B). At step S156 the first control data and the second control data are returned to the system control processor 64 where it is determined that the first control data 82(A), the second control data 82(B) and the previous control data 96 are all equal. Hence, the monitoring data is assumed to be accurately read and can be used by the system control processor 64 to perform a system control process.

Steps S158 to S160 illustrate a second read attempt by the system control processor 64 when the monitoring data has not been modified since the previous read attempt. At step S158, the system control processor 64 begins the process to read the monitoring data by issuing a request for the first control data 82(A) and the second control data 82(B). At step S160 this data is returned to the system control processor where it is determined that the first control data 82(A) and the second control data 82(B) are equal to each other and that the first control data 82(A) is equal to the previous control data value 96. Hence, the system control processor 64 can determine that it has already read the monitoring data and, hence, the system control processor 64 postpones reading the monitoring data 82(C).

In brief overall summary there is provided a data processing system and method for outputting from each of a plurality of monitoring units, for storage in storage circuitry, monitoring data indicative of a property of the data processing system, wherein at least one monitoring unit is provided within a power domain operable in a low power mode where the at least one monitoring unit is unable to output monitoring data. A system control processor is employed to read the monitoring data from the storage circuitry, and to perform system control operations in dependence on the monitoring data. In response to a notification that the power domain is to be placed into the low power mode, status data is output indicating that the at least one monitoring unit is disabled from generating monitoring data, the status data is stored in the storage circuitry, and subsequently the status data is provided to the system control processor in response to an attempt to read the monitoring data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. A data processing system comprising:
    a plurality of monitoring units, each monitoring unit being arranged to output, for storage in storage circuitry, monitoring data indicative of a property of the data processing system being monitored by that monitoring unit; and
    a system control processor to read the monitoring data from the storage circuitry and to perform one or more system control operations in dependence on the read monitoring data,
    wherein:
    at least one monitoring unit within the plurality of monitoring units is provided within a power domain that is operable in a plurality of power modes including a low power mode where the at least one monitoring unit is unable to output monitoring data; and
    the at least one monitoring unit is responsive to a notification that the power domain is to be placed into the low power mode, to output status data for storing in the storage circuitry to indicate that the at least one monitoring unit is currently disabled from generating monitoring data, the status data being stored within the storage circuitry such that when the system control processor subsequently attempts to read the monitoring data for the at least one monitoring unit, the system control processor is provided with the status data.

2. The data processing system of claim 1, wherein the system control processor is adapted to read the monitoring data from the storage circuitry asynchronously to the writing of the monitoring data by the plurality of monitoring units.

3. The data processing system of claim 2, wherein the plurality of monitoring units are arranged to operate independently of the system control processor to periodically output the monitoring data.

4. The data processing system of claim 1, further comprising:
    domain control circuitry within the power domain; and
    a power controller to perform a handshake communication with the domain control circuitry prior to placing the power domain into the low power mode.

5. The data processing system of claim 4, wherein the handshake communication comprises at least a request signal issued from the power controller to the domain control circuitry to indicate that the power domain is to be placed in the low power mode, and a response signal issued by the domain control circuitry to the power controller to indicate that components within the power domain are ready to be placed in the low power mode.

6. The data processing system of claim 5, wherein the domain control circuitry is adapted to wait for an indication from the at least one monitoring unit that the status data has been output for storage in the storage circuitry prior to issuing the response signal.

7. The data processing system of claim 1, wherein when the power domain subsequently exits the low power mode, the at least one monitoring unit is arranged to cause the status data to be cleared from the storage circuitry.

8. The data processing system of claim 1, wherein storing the status data in the storage circuitry for a given monitoring unit comprises overwriting previous monitoring data stored for the given monitoring unit.

9. The data processing system of claim 1, wherein storing the status data in the storage circuitry for a given monitoring unit comprises writing the status data as metadata stored in association with monitoring data stored for the given monitoring unit.

10. The data processing system of claim 1, wherein each monitoring unit is arranged to cause the monitoring data to be written to a location in the storage circuitry that is uniquely associated with that monitoring unit, the monitoring data overwriting previous monitoring data written to the location by that monitoring unit.

11. The data processing system of claim 1, wherein each monitoring unit is arranged to cause the monitoring data to be stored in association with a sample identifier when written in the storage circuitry to indicate which monitoring unit has output that monitoring data.

12. The data processing system of claim 1, wherein the storage circuitry is accessible to the system control processor when the power domain is in the low power mode.

13. The data processing system of claim 1, wherein the status data indicates that the power domain is in the low power mode.

14. The data processing system of claim 1, wherein the monitoring data is one of:
a system level parameter measured by a sensor coupled to the at least one monitoring unit; and
a performance metric of one or more components of the data processing system being monitored by the at least one monitoring unit.

15. The data processing system of claim 1, wherein the at least one monitoring unit is adapted to:
prior to outputting the monitoring data, write control data to the storage circuitry to indicate that the monitoring data is being written; and
subsequent to outputting the monitoring data, modify the control data to indicate that the monitoring data is not currently being written.

16. The data processing system of claim 15, wherein the system control processor is arranged, when the control data indicates that the monitoring data is being written, to postpone reading the monitoring data.

17. The data processing system of claim 15, wherein:
the control data comprises first control data and second control data;
writing the control data comprises writing, as the first control data, a counter value; and
modifying the control data comprises writing, as the second control data, the counter value.

18. The data processing system of claim 17, wherein the counter value is a timestamp indicative of a time at which the monitoring data is written.

19. The data processing system of claim 17, wherein:
the system control processor is arranged, prior to reading the monitoring data, to read the first control data and the second control data; and
when the first control data and the second control data comprise a same counter value to:
when the same counter value is equal to a previously read counter value, postpone reading the monitoring data; and
when the same counter value is different to the previously read counter value, read the monitoring data and set, as the previously read counter value, the same counter value.

20. The data processing system of claim 19, wherein:
the system control processor is adapted to, subsequent to reading the monitoring data, read the first control data and the second control data; and
when any two of the first control data, the second control data and the previously read counter value are different, to discard the monitoring data.

21. A data processing method comprising:
outputting from each monitoring unit of a plurality of monitoring units, for storage in storage circuitry, monitoring data indicative of a property of a data processing system being monitored by that monitoring unit, wherein at least one monitoring unit within the plurality of monitoring units is provided within a power domain that is operable in a plurality of power modes including a low power mode where the at least one monitoring unit is unable to output monitoring data;
employing a system control processor to read the monitoring data from the storage circuitry, and to perform one or more system control operations in dependence on the read monitoring data;
outputting, in response to a notification that the power domain is to be placed into the low power mode, status data for storing in the storage circuitry to indicate that the at least one monitoring unit is currently disabled from generating monitoring data;
storing the status data in the storage circuitry; and
providing, subsequently, the status data to the system control processor in response to an attempt to read the monitoring data.

22. A data processing system comprising:
means for outputting from each of a plurality of means for monitoring, for storage in means for storing, monitoring data indicative of a property of the data processing system being monitored by the means for monitoring, wherein at least one means for monitoring is provided within a power domain that is operable in a plurality of power modes including a low power mode where the at least one means for monitoring is unable to output monitoring data;
control means for reading the monitoring data from the means for storing and for performing one or more system control operations in dependence on the read monitoring data;
means for outputting, in response to a notification that the power domain is to be placed into the low power mode, status data for storing in the means for storing to indicate that the at least one means for monitoring is currently disabled from generating monitoring data;
means for storing the status data in the means for storing; and
means for providing, subsequently, the status data to the control means in response to an attempt to read the monitoring data.

* * * * *